United States Patent
Bruni et al.

(10) Patent No.: US 7,073,655 B2
(45) Date of Patent: Jul. 11, 2006

(54) DEVICE FOR PROCESSING SUBSTANTIALLY PARALLELEPIPED-SHAPED PRODUCTS

(75) Inventors: Stefano Bruni, San Giovanni In Persiceto (IT); Fiorenzo Draghetti, Medicina (IT)

(73) Assignee: G.D Societa' per Azioni, Bologna (IT)

( * ) Notice: Subject to any disclaimer, the term of this patent is extended or adjusted under 35 U.S.C. 154(b) by 94 days.

(21) Appl. No.: 10/942,751

(22) Filed: Sep. 16, 2004

(65) Prior Publication Data
US 2005/0186052 A1  Aug. 25, 2005

(30) Foreign Application Priority Data
Sep. 17, 2003  (IT) .............................. BO03A0539

(51) Int. Cl.
   *B65G 47/26* (2006.01)
(52) U.S. Cl. .................... 198/429; 198/347.1; 198/433
(58) Field of Classification Search ............ 198/341.1, 198/347.3, 428, 418.5, 433, 597, 461.1, 461.2
   See application file for complete search history.

(56) References Cited

U.S. PATENT DOCUMENTS

| | | | | |
|---|---|---|---|---|
| 2,685,358 A | * | 8/1954 | Heil et al. ............... | 198/347.1 |
| 2,781,121 A | | 2/1957 | Brandenberger | |
| 3,499,555 A | | 3/1970 | Wahle | |
| 3,506,110 A | * | 4/1970 | Paul ......................... | 198/347.4 |
| 4,193,784 A | * | 3/1980 | Mumford .................... | 198/429 |
| 4,529,081 A | * | 7/1985 | Tanaka ........................ | 198/429 |
| 4,609,091 A | * | 9/1986 | Dorner .................... | 198/347.3 |
| 5,009,303 A | * | 4/1991 | Lutzke .................... | 198/347.3 |
| 5,350,050 A | * | 9/1994 | Franke .................... | 198/347.1 |
| 6,164,045 A | * | 12/2000 | Focke et al. ................ | 198/429 |

FOREIGN PATENT DOCUMENTS

| | | |
|---|---|---|
| DE | 22 04 739 | 8/1973 |
| DE | 41 19 514 | 12/1992 |
| EP | 0 666 229 | 8/1995 |

OTHER PUBLICATIONS

English Abstract of DE 41 19 514 dated Dec. 17, 1992.
English Abstract of EP 0 666 229 dated Aug. 9, 1995.

* cited by examiner

*Primary Examiner*—James R. Bidwell
(74) *Attorney, Agent, or Firm*—Ladas and Parry LLP

(57) ABSTRACT

A device for processing packets of cigarettes has a transportation unit for conveying a line of packets from an input station to an output station in a direction perpendicular to the line; a conveyor unit for feeding the line to the input station in a direction parallel to the line; and a transfer unit for transferring the line from the conveyor unit to the transportation unit; the transfer unit has a first pusher for transferring the line from the conveyor unit to an intermediate conveyor which reduces the longitudinal speed of the line to zero, and a second pusher for transferring the line from the intermediate conveyor to the transportation unit.

25 Claims, 4 Drawing Sheets

DEVICE FOR PROCESSING SUBSTANTIALLY PARALLELEPIPED -SHAPED PRODUCTS

The present invention relates to a device for processing substantially parallelepiped-shaped products.

The present invention may be used to advantage for processing packets of cigarettes, to which the following description refers purely by way of example.

BACKGROUND OF THE INVENTION

In the tobacco industry, devices for processing packets of cigarettes are normally located between a production machine—normally a packing or cellophaning machine—and a user machine—normally a cellophaning machine or cartoning machining respectively—to compensate for differences in output between the two machines.

A device for processing packets of cigarettes has recently been proposed comprising a conveyor unit for feeding lines of packets in a first direction parallel to the lines; a transportation unit for conveying the lines in a second direction, crosswise to the first direction, along a transportation path; and a transfer unit for transferring the lines between the conveyor unit and the transportation unit.

The above device involves changing the travelling direction of each line of packets of cigarettes from a first travelling direction to a second travelling direction; and, before the change in direction is made, the packets must be braked in the first direction and then accelerated in the second direction. The packets are normally braked or accelerated by acting on an end packet, i.e. a packet at one end of the line; and, given the relatively high output speeds of modern tobacco industry machines, the packets, and particularly the end packet, are severely stressed when changing direction, and therefore subject to damage.

Moreover, the transportation unit normally comprises belts running along the transportation path about pulleys, and for advancing pockets housing the lines. Known devices of the above type therefore have the further drawback of wasting space and having a relatively low capacity-volume ratio.

SUMMARY OF THE INVENTION

It is an object of the present invention to provide a device for processing substantially parallelepiped-shaped products, designed to eliminate the aforementioned drawbacks, and which at the same time is cheap and easy to produce.

According to the present invention, there is provided a device for processing substantially parallelepiped-shaped products, the device comprising a conveyor unit for feeding a line of said products in a first direction parallel to the line and at a first speed; a transportation unit for conveying the line along a transportation path in a second direction crosswise to the first direction; and a transfer unit for transferring the line, at a transfer station, between the transportation unit and the conveyor unit; the device being characterized in that the transfer unit comprises an intermediate conveyor located between the conveyor unit and the transportation unit; and first transfer means for moving the line between the intermediate conveyor and the transportation unit; the intermediate conveyor moving the line in the first direction at a variable second speed which, in use, during transfer between the conveyor unit and the intermediate conveyor, is substantially equal to said first speed, and, during transfer between the intermediate conveyor and the transportation unit, is substantially zero.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
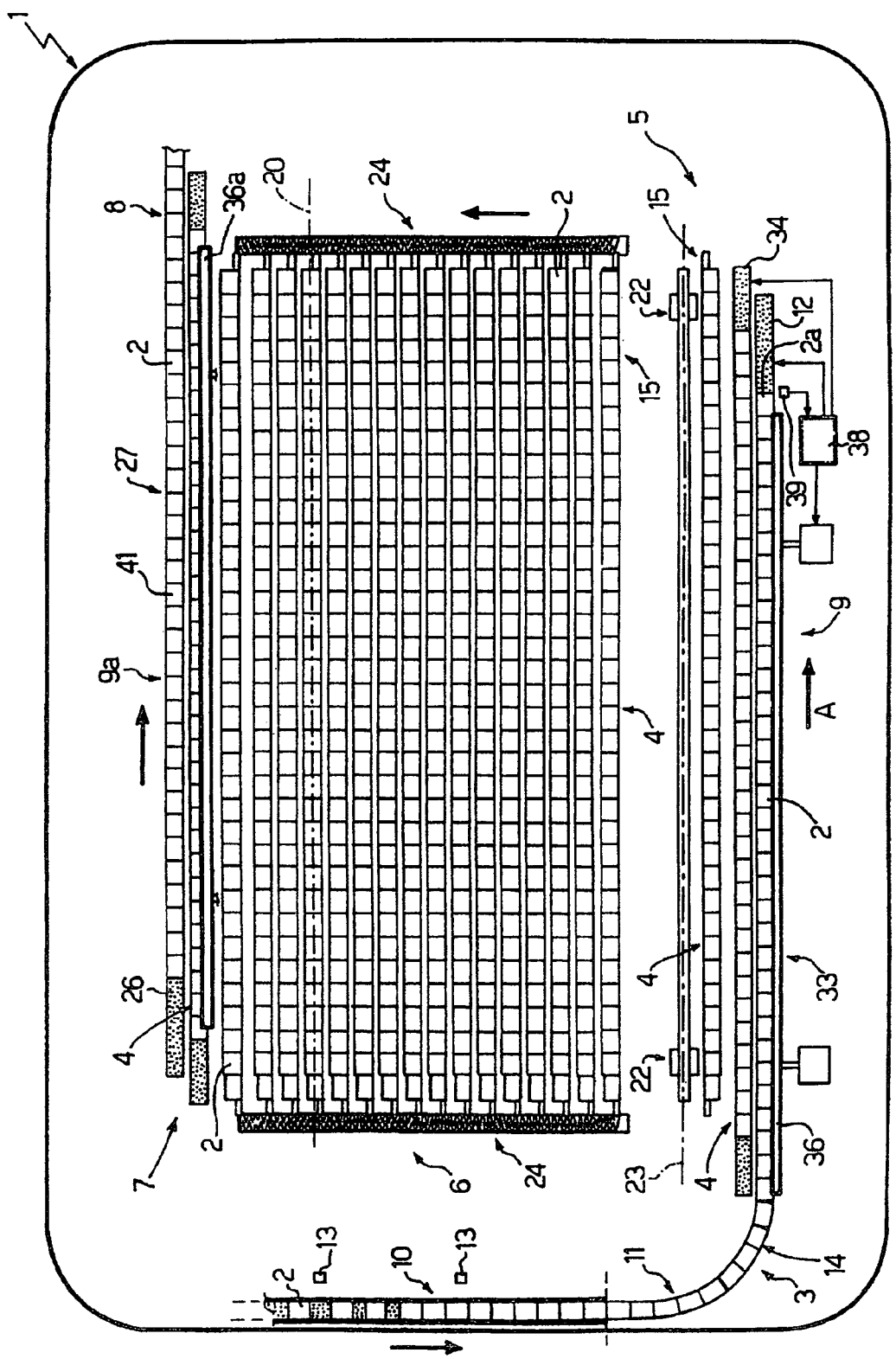
FIG. 1 shows a schematic plan view, with parts removed for clarity, of a device in accordance with the present invention.

Number 1 in FIG. 1 indicates as a whole a device for processing packets 2 of cigarettes. Device 1 is located between a known production machine (not shown), e.g. a packing machine or cellophaning machine, and a known user machine (not shown), e.g. a cellophaning machine or cartoning machine respectively, to compensate for differences in output between the two known machines (not shown).

Device 1 comprises a conveyor unit 3 for feeding lines 4 of packets 2 from the known production machine (not shown) to a transfer station (input station) 5; a transportation and storage unit 6 for conveying the lines from transfer station 5 to a transfer station (output station) 7; and a conveyor unit 8 for feeding lines 4 from transfer station 7 to the known user machine (not shown). Each line 4 comprises a given number of packets 2.

The device also comprises two transfer units 9 and 9a located at respective transfer stations 5 and 7, and for transferring each line 4 from conveyor unit 3 to transportation unit 6, and from transportation unit 6 to conveyor unit 8 respectively.

Conveyor unit 3 comprises a belt conveyor 10 for feeding packets 2 successively from the known production machine (not shown), and at a given speed V1 substantially equal to the output speed V2 of packets 2 from the production machine, to a further belt conveyor 11 which is located immediately downstream from conveyor 10, provides for feeding packets 2 to transportation unit 6 in a given direction A, and comprises a substantially straight end portion 12.

Conveyor unit 3 also comprises a number of sensors 13 located along conveyor 10 to detect any gaps between packets 2 on conveyor 10; and a central control unit (not shown) which, on the basis of the findings of sensors 13, regulates the speed V3 of conveyor 11 so that a continuous succession 14 of packets 2 is formed at least on conveyor 11. More specifically, in actual use, the speed V3 at which packets 2 are conveyed by conveyor 11 is reduced with respect to the speed V1 at which packets 2 are conveyed by conveyor 10.

Figure 2:
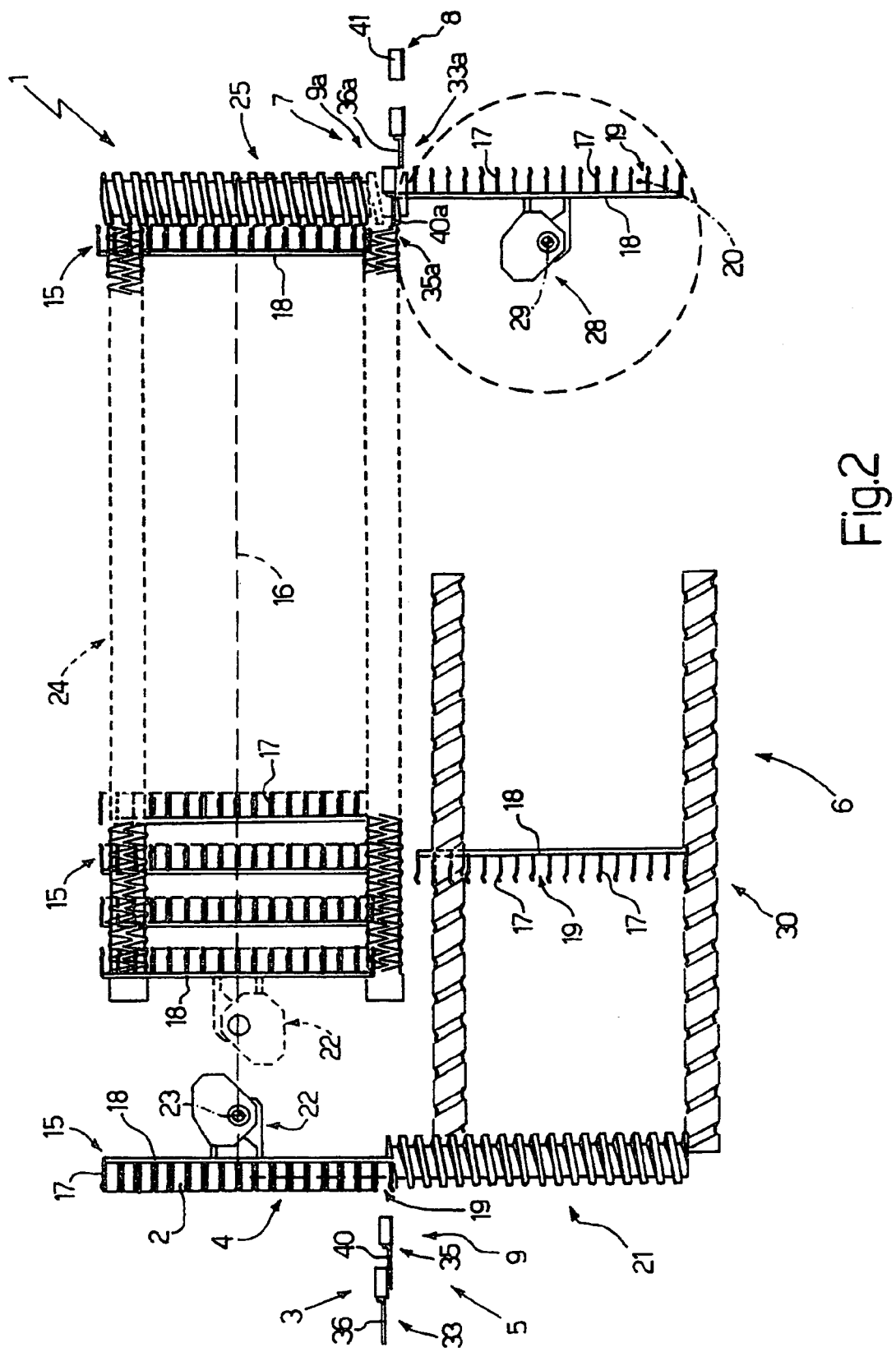
FIGS. 2 and 3 show a side and front view respectively, with parts removed for clarity, of the FIG. 1 device.

With particular reference to FIG. 2, transportation unit 6 substantially acts as a variable-capacity FIFO (First In-First Out) store for packets 2, and comprises a number of transportation assemblies 15, each for housing a number of lines 4 and conveying lines 4 from transfer station 5 to transfer station 7 along a transportation path 16 and in direction crosswise, and in particular substantially perpendicular, to end portion 12 of conveyor 11 and to direction A. Transportation path 16 is of a given fixed length.

Each transportation assembly 15 comprises two respective substantially parallel lateral posts 18; and a number of—in the example shown, sixteen—elongated plates 17 which are crosswise, and in particular substantially perpendicular, to the two posts 18, are substantially parallel to direction A, and define a succession of respective elongated pockets 19. Each elongated pocket 19 houses a respective line 4, is open at the front, and has a respective longitudinal axis 20 substantially parallel to direction A and perpendicular to posts 18.

Figure 3:
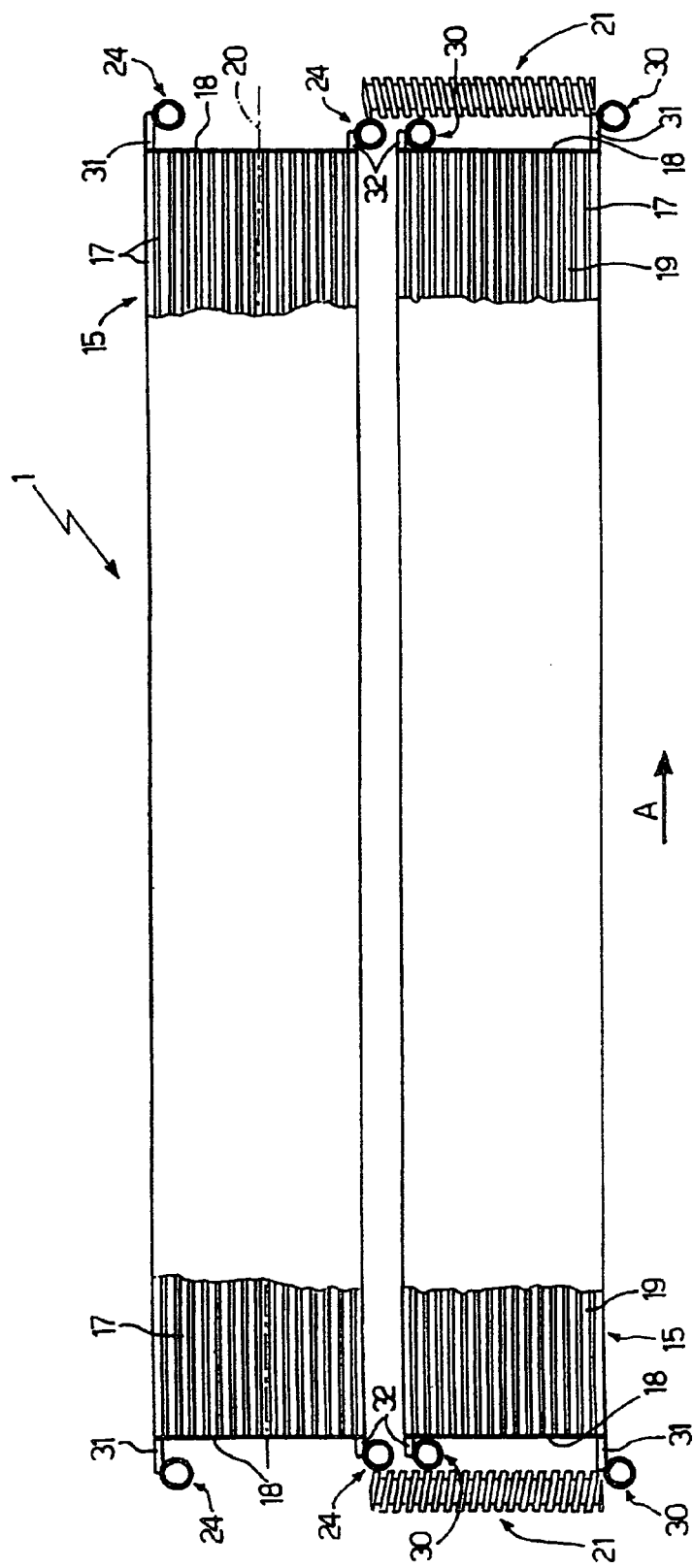

With particular reference to FIG. 3, transportation unit 6 comprises a screw conveyor 21 for moving each transportation assembly 15 at transfer station 5 in a direction crosswise, and in particular substantially perpendicular, to direction A and substantially parallel to posts 18, so as to successively position each pocket 19 facing end portion 12 of conveyor 11. In actual use, when a pocket 19 is so positioned, transfer unit 9 transfers a line 4 from end portion 12 to pocket 19.

Transportation unit 6 also comprises a conveying assembly 22 (FIG. 2) located downstream from conveyor 21, and which provides for rotating each transportation assembly 15 roughly 180° about an axis 23 substantially parallel to direction A, and for conveying each transportation assembly 15 from conveyor 21 to a screw conveyor 24, which in turn feeds each transportation assembly 15 to a screw conveyor 25 located at transfer station 5. Conveyor 24 feeds transportation assemblies 15 in a direction substantially perpendicular to direction A and to posts 18, so that posts 18 are maintained substantially parallel to themselves.

Conveyor 25 moves each transportation assembly 15 at transfer station 7 in a direction crosswise, and in particular substantially perpendicular, to direction A and substantially parallel to posts 18, so as to successively position each pocket 19 facing a substantially straight start portion 26 of a conveyor 27 of conveyor unit 8. In actual use, when a pocket 19 is so positioned, transfer unit 9a transfers a line 4 from pocket 19 to start portion 26.

Start portion 26 feeds lines 4 in direction A and in the same sense in which lines 4 are conveyed, in use, by end portion 12.

Transportation unit 6 also comprises a conveying assembly 28 located downstream from conveyor 25, and which provides for rotating each transportation assembly 15 roughly 180° about an axis 29 substantially parallel to direction A and perpendicular to posts 18, and for conveying each transportation assembly 15 from conveyor 25 to a screw conveyor 30, which in turn feeds each transportation assembly 15 to screw conveyor 21.

Each transportation assembly 15 also comprises two respective supporting members 31, and two respective supporting members 32; and each of supporting members 31 and 32 is located at a respective end of a relative post 18, and engages a respective feed groove of conveyors 24 and 30. Supporting members 31 also engage feed grooves of conveyors 21 and 25.

Transportation unit 6 thus acts as a variable-capacity FIFO store. In this connection, it should be pointed out that, in use, the first transportation assembly 15 to be filled with lines 4 is also the first transportation assembly 15 to be emptied, and, by virtue of the rotation performed by conveying assembly 22, the first pocket 19 of each transportation assembly 15 into which a respective line 4 is fed is also the first pocket 19 to be emptied. The extent to which transportation unit 6 is filled is indicated by the number of full transportation assemblies 15 present along transportation path 16, and particularly in conveyor 24.

It should also be pointed out that, particularly by virtue of conveying assembly 22 conveying each transportation assembly 15 independently of the other transportation assemblies 15, transportation assemblies 15 are arranged on conveyor 24 (as shown more clearly in FIGS. 1 and 2) with a minimum of wasted space. In other words, the ratio between the number of packets 2 transportation unit 6 can contain, and the volume occupied by transportation unit 6 is relatively high. Further space saving is afforded by the particular location of supporting members 31 and 32, which enables the transportation assemblies to be packed tightly inside conveyor 24.

In this connection, it should be pointed out that supporting members 31 and 32 extend substantially parallel to direction A, so that transportation assemblies 15 can be packed tightly and compactly along conveyor 24.

Transfer unit 9 comprises a transfer assembly 33 for transferring each line 4, in a direction crosswise to direction A, from end portion 12 to an intermediate belt conveyor 34 substantially parallel to direction A; and a transfer assembly 35 for transferring each line 4 from intermediate conveyor 34 to a respective pocket 19 in a direction crosswise, and in particular substantially perpendicular, to direction A.

It should be pointed out that intermediate conveyor 34 is located substantially facing end portion 12 of conveyor 11 and lower down than end portion 12, and that transfer assembly 35 is located partly beneath portion 12.

Figure 4:
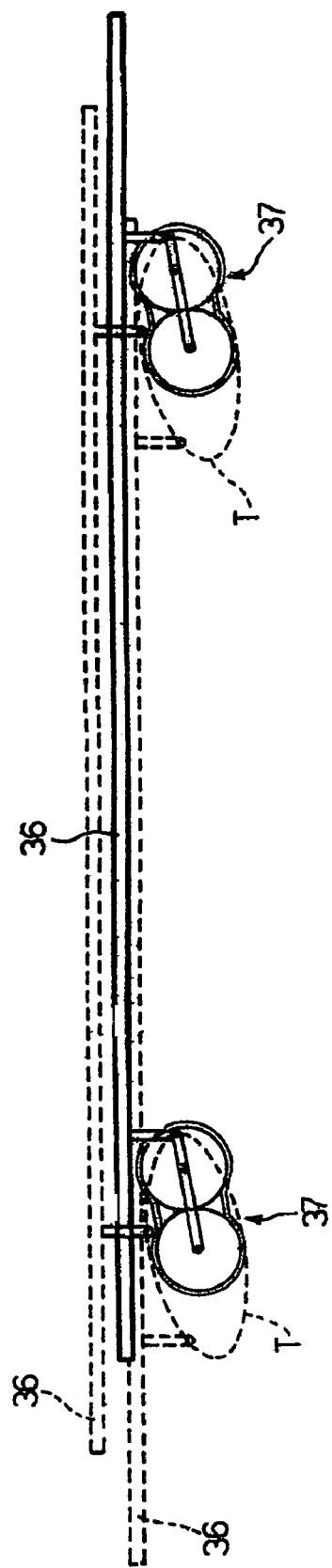
FIG. 4 shows a detail of FIG. 1 in different operating positions.

Transfer assembly 33 comprises a pusher 36 which is activated by a known epicyclic mechanism 37 (shown schematically in FIG. 4) to describe, in use, a substantially oval trajectory T.

Transfer unit 9 also comprises a central control unit 38 (FIG. 1) for operating mechanism 37, as a function of speed V3 of conveyor 11 and of the findings of a sensor 39, so that pusher 36 does not interfere with the movement of succession 14 in direction A. Sensor 39 provides for detecting the position of a lead packet 2a in succession 14. More specifically, in use, the variable angular speed V4 of pusher 36 has a component parallel to direction A, and which is substantially equal to the travelling speed V3 of succession 14 in direction A on commencing transfer from conveyor 10 to intermediate conveyor 34, and is lower than travelling speed V3 of succession 14 in direction A when transfer is completed.

Central control unit 38 also regulates the speed V5 at which intermediate conveyor 34 feeds each line 4 in direction A, so that, in use, it is substantially equal to the travelling speed V3 of succession 14 in direction A on commencing transfer from conveyor 10 to intermediate conveyor 34, and is substantially zero when transfer is completed.

Transfer unit 9 therefore provides for changing the travelling direction of each line 4 with no relatively serious damage to packets 2. In this connection, it should be pointed out that, when changing direction, packets 2, and particularly the lead packet 2a, undergo relatively little deceleration, and are subjected to relatively little stress.

Transfer unit 9a is substantially the same as transfer unit 9, and comprises components equivalent to those of transfer unit 9, and which are indicated in the drawings using the same reference numbers, with the suffix "a", as for the corresponding components of transfer unit 9. Transfer unit 9a differs from transfer unit 9 only as regards those characteristics enabling it to transfer lines 4 from transportation unit 6 to conveyor unit 8.

Operation of the device will now be described with reference to one line 4, and as of the instant in which sensor 39 detects the correct position of lead packet 2a.

Pusher 36 transfers line 4 from end portion 12 of conveyor 11 to intermediate conveyor 34. At this point, intermediate conveyor 34 reduces the speed V5 of line 4 in direction A to substantially zero.

At this point, a pusher 40 of transfer assembly 35 pushes line 4, in a direction crosswise, and in particular substantially perpendicular, to direction A and to posts 18, into a pocket 19 of a transportation assembly 15 located at transfer station 5.

Once line 4 is transferred into pocket 19, transportation assembly 15 is raised in a direction substantially parallel to posts 18 and perpendicular to direction A, until a following empty pocket 19 is positioned facing intermediate conveyor 34, and the bottom plate 17 of the following pocket 19 is coplanar with intermediate conveyor 34.

Once all the pockets 19 of transportation assembly 15 have been filled, conveying assembly 22 rotates transportation assembly 15 through 180°, and feeds it to conveyor 24, which in turn feeds transportation assembly 15 to transfer station 7 in a direction crosswise to posts 18 and to direction A.

At this point, when transportation assembly 15 is lowered sufficiently by conveyor 25, line 4 is fed by transfer unit 9a to conveyor unit 8 in such a manner as to form a further continuous succession 41 of packets 2 on conveyor unit 8.

In further embodiments, only one of transfer units 9 and 9a is as described above, while the other is a known transfer unit.

Device 1 as described above may obviously be used for processing any type of preferably substantially parallelepiped-shaped product 2, such as food boxes, books, holders for audio or audiovisual media, and plastic or metal containers.

The invention claimed is:

1. A device for processing substantially parallelepiped-shaped products, the device (1) comprising a conveyor unit (3; 8) for feeding a line (4) of said products (2) in a first direction (A) parallel to the line (4) and at a first speed (V3); a transportation unit (6) for conveying the line (4) along a transportation path (16) in a second direction crosswise to the first direction (A); and a transfer unit (9; 9a) for transferring the line (4), at a transfer station (5; 7), between the transportation unit (6) and the conveyor unit (3; 8); the device (1) being characterized in that the transfer unit (9; 9a) comprises an intermediate conveyor (34; 34a) located between the conveyor unit (3; 8) and the transportation unit (6); and first transfer means (33; 33a) for moving the line (4) between the intermediate conveyor (34; 34a) and the transportation unit (6); the intermediate conveyor (34; 34a) moving the line (4) in the first direction (A) at a variable second speed (V5) which, in use, during transfer between the conveyor unit (3; 8) and the intermediate conveyor (34; 34a), is substantially equal to said first speed (V3), and, during transfer between the intermediate conveyor (34; 34a) and the transportation unit (6), is substantially zero.

2. A device as claimed in claim 1, wherein said transfer unit (9; 9a) comprises second transfer means (35; 35a) for moving the line (4) between the conveyor unit (3; 8) and the intermediate conveyor (34; 34a).

3. A device as claimed in claim 1, wherein said conveyor unit (3; 8) continuously feeds a continuous succession (14) of products (2) to the transfer station (5; 7).

4. A device as claimed in claim 3, wherein said transfer unit (9; 9a) comprises second transfer means (35; 35a) for moving the line (4) between the conveyor unit (3; 8) and the intermediate conveyor (34; 34a); the movements of the second transfer means (35; 35a) and the first speed (V3), at which the continuous succession (14) of products (2) is fed to the transfer station (5; 7), being regulated so that the second transfer means (35; 35a) do not interfere with the movement of the continuous succession (14) in said first direction (A).

5. A device as claimed in claim 1, wherein the first transfer means (33; 33a) comprise a first pusher (36; 36a) which moves crosswise to the first direction (A).

6. A device as claimed in claim 2, wherein said second transfer means (35; 35a) comprise a second pusher (40; 40a); and actuating means (37) for moving the second pusher (40; 40a) along a substantially oval trajectory (T).

7. A device as claimed in claim 1, wherein the transfer unit (9) transfers said line (4) from the conveyor unit (3) to the transportation unit (6); in use, the second speed (V5) being substantially equal to the first speed (V3) when commencing transfer from the conveyor unit (3) to the intermediate conveyor (34), and being substantially zero when commencing transfer from the intermediate conveyor (34) to the transportation unit (6).

8. A device as claimed in claim 7, wherein said transfer unit (9; 9a) comprises second transfer means (35; 35a) for moving the line (4) between the conveyor unit (3; 8) and the intermediate conveyor (34; 34a); said second transfer means (35; 35a) comprising a second pusher (40; 40a), and actuating means (37) for moving the second pusher (40; 40a) along a substantially oval trajectory (T); the second pusher (40) moving at a variable angular speed (V4); and the variable angular speed (V4) having a component parallel to said first direction (A) and substantially equal to the first speed (V3) when commencing transfer, in use, from the conveyor unit (3) to the intermediate conveyor (34).

9. A device as claimed in claim 7, wherein the conveyor unit (3) comprises a first conveyor (11) having an end portion (12) at least partly facing said intermediate conveyor (34).

10. A device as claimed in claim 9, wherein the end portion (12) is located higher than the intermediate conveyor (34); said first transfer means (33) being located at least partly beneath the end portion (12).

11. A device as claimed in claim 9, wherein the conveyor unit (3) comprises a second conveyor (10) immediately upstream from the first conveyor (11) and for feeding the products (2) to the first conveyor (11) at a third speed (V1); the first conveyor (11) reducing the first speed (V3) with respect to the third speed (V1) so that a continuous succession (14) of products (2) is formed on the first conveyor (11).

12. A device as claimed in claim 7, wherein the conveyor unit (3) comprises a first and a second conveyor (11, 10), which second conveyor (10) is located upstream from the first conveyor (11) and conveys the products (2) at a third speed (V1); the second conveyor (10) varying the third speed (V1) as a function of the output speed (V2) of the products (2) off a production machine located upstream from the second conveyor (10).

13. A device as claimed in claim 1, wherein the transfer unit (9a) transfers said line (4) from the transportation unit (6) to the conveyor unit (8); in use, the second speed (V5) being substantially zero when commencing transfer from the transportation unit (6) to the intermediate conveyor (34a), and being substantially equal to the first speed (V3) when commencing transfer from the intermediate conveyor (34a) to the conveyor unit (8).

14. A device as claimed in claim 1, wherein the intermediate conveyor (34a) comprises a belt conveyor.

15. A device as claimed in claim 1, wherein said transportation unit (6) comprises transportation assemblies (15) movable in the second direction along the transportation path (16); each transportation assembly (15) having at least one respective elongated pocket (19) which receives a respective said line (4) and has a respective longitudinal axis (20); the longitudinal axes (20) being substantially parallel to one another and crosswise to the second direction; said transportation path (16) being of a given fixed length; and each transportation assembly (15) being movable substantially independently of the other transportation assemblies (15) along at least a portion of the transportation path (16).

16. A device as claimed in claim 15, wherein each transportation assembly (15) comprises two respective substantially parallel posts (18); and a number of respective elongated pockets (19), the respective longitudinal axes (20) of which are crosswise to the two posts (18) and substantially parallel to the first direction (A).

17. A device as claimed in claim 16, and comprising first conveying means (21) for moving each transportation assembly (15), at the transfer station (5), in a direction substantially parallel to the posts (18), so as to successively load the pockets (19) of the transportation assembly (15).

18. A device as claimed in claim 16, and comprising second conveying means (22) for rotating the transportation assemblies (15) about an axis (23) of rotation substantially parallel to said longitudinal axes (20).

19. A device as claimed in claim 16, and comprising third conveying means (24) for moving the transportation assemblies (15) crosswise to the posts (18) along at least a portion of the transportation path (16), while maintaining the posts (18) substantially parallel to themselves.

20. A device for processing substantially parallelepiped-shaped products, the device (1) comprising a transportation and storage unit (6); a first conveyor unit (3) for feeding a line (4) of said products (2) in a first direction (A) to the transportation and storage unit (6) at an input station (5); and a second conveyor unit (8) for receiving said line (4) from the transportation and storage unit (6) at an output station (7); said transportation and storage unit (6) comprising transportation assemblies (15) movable, in a second direction crosswise to the first direction, along a transportation path (16) to transfer the products (2) from the input station (5) to the output station (7); each transportation assembly (15) having at least one respective elongated pocket (19), which receives a respective said line (4) and has a respective longitudinal axis (20); the longitudinal axes (20) being substantially parallel to one another and crosswise to the second direction; and the device (1) being characterized in that said transportation path (16) is of a given fixed length; and in that each transportation assembly (15) is movable substantially independently of the other transportation assemblies (15) along at least a portion of the transportation path (16).

21. A device as claimed in claim 20, wherein each transportation assembly (15) comprises two respective substantially parallel posts (18); and a number of respective pockets (19) fitted successively to the posts (18), and the respective longitudinal axes (20) of which are crosswise to the posts (18) and substantially parallel to the first direction (A).

22. A device as claimed in claim 21, and comprising first conveying means (21) for moving each transportation assembly (15), at the input station (5), in a direction parallel to the posts (18), so as to successively load the pockets (19) of the transportation assembly (15).

23. A device as claimed in claim 21, and comprising second conveying means (22) for rotating the transportation assemblies (15) about an axis (23) of rotation substantially parallel to said longitudinal axes (20).

24. A device as claimed in claim 21, and comprising third conveying means (24) for moving the transportation assemblies (15) crosswise to the posts (18) along at least a portion of the transportation path (16), while maintaining the posts (18) substantially parallel to themselves.

25. A device as claimed in claim 21, wherein each transportation assembly (15) comprises at least two supporting members (31; 32), each of which projects substantially perpendicularly from a respective said post (18); the supporting members (31; 32) supporting the respective transportation assemblies (15) and transmitting motion to the transportation assemblies (15).

* * * * *